United States Patent
Ramaswamy et al.

(10) Patent No.: US 9,866,056 B2
(45) Date of Patent: Jan. 9, 2018

(54) LITHIUM SULFUR BATTERY PULSE CHARGING METHOD AND PULSE WAVEFORM

(71) Applicant: NISSAN NORTH AMERICA, INC., Franklin, TN (US)

(72) Inventors: Nagappan Ramaswamy, Farmington Hills, MI (US); Peter Aurora, Ann Arbor, MI (US); Gregory Dileo, Ann Arbor, MI (US); Xiaoguang Hao, Ann Arbor, MI (US); Taehee Han, Farmington Hills, MI (US); Rameshwar Yadav, Novi, MI (US); Ellazar Niangar, Farmington Hills, MI (US); Kenzo Oshihara, Novi, MI (US)

(73) Assignee: Nissan North America, Inc., Franklin, TN (US)

( * ) Notice: Subject to any disclaimer, the term of this patent is extended or adjusted under 35 U.S.C. 154(b) by 0 days.

(21) Appl. No.: 15/087,257

(22) Filed: Mar. 31, 2016

(65) Prior Publication Data
US 2016/0218522 A1    Jul. 28, 2016

Related U.S. Application Data

(62) Division of application No. 14/171,933, filed on Feb. 4, 2014, now Pat. No. 9,331,364.

(51) Int. Cl.
*H01M 10/42* (2006.01)
*H01M 10/44* (2006.01)
(Continued)

(52) U.S. Cl.
CPC .............. *H02J 7/007* (2013.01); *C25F 1/00* (2013.01); *H01M 10/052* (2013.01);
(Continued)

(58) Field of Classification Search
CPC ... H01M 10/42; H01M 10/44; H01M 10/4242
See application file for complete search history.

(56) References Cited

U.S. PATENT DOCUMENTS 5,891,590 A * 4/1999 King .................. H01M 6/5072
320/139
7,786,702 B1   8/2010 Chait et al.
(Continued)

FOREIGN PATENT DOCUMENTS

| EP | 2124312 A2 | 11/2009 |
| EP | 1618643 B2 | 3/2013 |
| JP | 04801304 B2 | 10/2011 |

*Primary Examiner* — Nicholas A Smith
(74) *Attorney, Agent, or Firm* — Young Basile Hanlon & MacFarlane, P.C.

(57) ABSTRACT

Provided are methods and apparatus for charging a lithium sulfur (Li—S) battery. The Li—S battery has at least one unit cell comprising a lithium-containing anode and a sulfur-containing cathode with an electrolyte layer there between. One method provides controlled application of voltage pulses at the beginning of the charging process. An application period is initiated after a discharge cycle of the Li—S battery is complete. During the application period, voltage pulses are provided to the Li—S battery. The voltage pulses are less than a constant current charging voltage. Constant current charging is initiated after the application period has elapsed.

13 Claims, 3 Drawing Sheets

(51) Int. Cl.
    *H02J 7/00*           (2006.01)
    *C25F 1/00*           (2006.01)
    *H01M 10/052*       (2010.01)
    *H01M 10/46*        (2006.01)

(52) U.S. Cl.
    CPC ......... *H01M 10/42* (2013.01); *H01M 10/425* (2013.01); *H01M 10/4242* (2013.01); *H01M 10/44* (2013.01); *H01M 10/446* (2013.01); *H01M 10/46* (2013.01); *H02J 7/00* (2013.01); *H02J 7/0052* (2013.01); *H02J 7/0075* (2013.01); *H02J 7/0093* (2013.01); *H01M 2220/20* (2013.01)

(56) References Cited

U.S. PATENT DOCUMENTS

| | | |
|---|---|---|
| 2003/0104272 A1 | 6/2003 | Yamaguchi et al. |
| 2006/0220616 A1 | 10/2006 | Okuno |
| 2014/0197797 A1 | 7/2014 | Yamazaki |
| 2014/0262820 A1* | 9/2014 | Kuan ........................ C25F 3/14 205/665 |

* cited by examiner

LITHIUM SULFUR BATTERY PULSE CHARGING METHOD AND PULSE WAVEFORM

CROSS REFERENCE TO RELATED APPLICATION

This application is a divisional application of U.S. patent application Ser. No. 14/171,933, filed on Feb. 4, 2014, which is incorporated herein by reference in its entirety.

TECHNICAL FIELD

This disclosure relates to methods for improving the cell life of a lithium sulfur battery, and in particular, methods for improving dissolution of electronically resistive lithium sulfide deposits that degrade cell performance.

BACKGROUND

The lithium-sulfur battery (Li—S battery) is a rechargeable battery, notable for its high energy density. Li—S batteries may be a successful alternative to lithium-ion cells because of their higher energy density and reduced cost from the use of sulfur. However, Li—S batteries do present some challenges that must be addressed before the advantages of Li—S batteries can be fully appreciated. For example, during discharge, a film-like insulating layer of lithium sulfide can form on the cathode. During subsequent charging, this insulating layer leads to high ohmic resistance and voltage losses.

SUMMARY

Provided are methods and apparatus for charging a Li—S battery. The Li—S battery has at least one unit cell comprising a lithium-containing anode and a sulfur-containing cathode with an electrolyte layer there between. One method provides controlled application of voltage pulses at the beginning of the charging process. An application period is initiated after a discharge cycle of the Li—S battery is complete. During the application period, voltage pulses are provided to the Li—S battery. The voltage pulses are less than a constant current charging voltage. Constant current charging is initiated after the application period has elapsed.

An apparatus for charging a lithium-sulfur battery having at least one unit cell comprising a lithium-containing anode and a sulfur-containing cathode with an electrolyte layer there between is also disclosed. The apparatus comprises a memory and a processor configured to execute instructions stored in the memory to apply voltage pulses for an application period, the application period initiated when a battery charge cycle is initiated, wherein the voltage pulses are less than a constant current charging voltage, and initiate constant current charging after the application period is complete.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity. Included in the drawings are the following figures.

DETAILED DESCRIPTION

Unlike in a lithium ion battery, lithium is not intercalated inside another substance in the Li—S battery; rather, lithium metal is the negative electrode. Sulfur is used as the positive electrode active material. Because sulfur is well known as an insulator, the sulfur is typically combined with a material having good conductivity, such as carbon. A carbon coating can provide the missing electronic conductivity. Carbon nanofibers can provide an effective electron conduction path and structural integrity.

Chemical processes in the Li—S cell include lithium dissolution from the anode surface (and incorporation into alkali metal polysulfide salts) during discharge, and reverse lithium plating to the anode while charging. Because the lithium ions are not intercalated in the anode and cathodes as in the conventional lithium ion cell, the Li—S cell allows for a much higher lithium storage density. The lithium, during discharge, is transported across the electrolyte from the anode to the cathode and reacts with sulfur to undergo the following reaction, with a reverse reaction occurring when the cell is charged:

$$S_8 \rightarrow Li_2S_6 \rightarrow Li_2S_4 \rightarrow Li_2S_3 \rightarrow Li_2S_2 \rightarrow Li_2S$$

During discharge, lithium undergoes oxidation on the anode and subsequently reacts with the sulfur on the cathode to form lithium sulfide, $Li_2S$. Lithium sulfide is an electronically insulating and chemically insoluble species. Complete discharge of the battery can lead to the formation of large agglomerated particles of lithium sulfide or a film-like insulating layer of lithium sulfide on the cathode. During a subsequent charge process, the high electronic resistivity of the lithium sulfide species leads to high ohmic resistance and voltage losses, resulting in poor coulombic efficiency, defined as follows:

$$n_c = \frac{Q_{out}}{Q_{in}}$$

where $n_c$ is the coulombic efficiency, $Q_{out}$ is the amount of charge that exits the battery during the discharge cycle and $Q_{in}$ is the amount of charge that enters the battery during the charging cycle.

As the insulating film continues to accumulate irreversibly over the cycling process, less lithium and sulfur are available as active species, leading to exponentially decreasing capacity.

The device and methods herein address these deficiencies in the Li—S battery by disrupting the film-like insulating layer on the cathode, thereby improving the Li—S battery's coulombic efficiency, improving the battery's charge efficiency, enhancing the battery's rate capability, decreasing charge cycle duration and reclaiming active sulfur particles.

Figure 1:
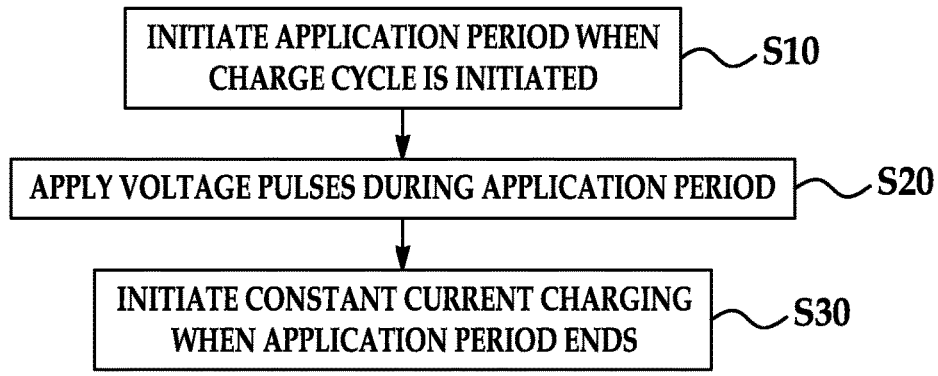
FIG. 1 is a flow diagram of a method of charging a Li—S battery as disclosed herein.

FIG. 1 is a flow diagram of a method of charging a Li—S battery as taught herein. The Li—S battery has at least one unit cell comprising a lithium-containing anode and a sulfur-containing cathode with an electrolyte layer there between. The method provides controlled application of voltage pulses at the beginning of the charging process. In step S10, an application period is initiated when a charge cycle of the Li—S battery is initiated. In step S20, during the application period, voltage pulses are provided to the Li—S battery. The voltage pulses are less than a constant current charging voltage. In step S30, constant current charging is initiated after the application period has elapsed.

The charge cycle is typically initiated directly after a discharge cycle is complete, which is typically when the battery is about 20% state-of-charge. However, the charge cycle may be initiated at any time after some discharge has occurred. Initiation of the charge cycle can occur when, for example, the vehicle is connected to a charger. It should be noted that the application period does not need to be initiated every time a charge cycle is initiated. For example, if the battery has only been discharged to 50%, lithium sulfide may have not yet started to agglomerate or form the film-like insulating layer. The application period is not yet necessary. Therefore, the application period may only be applied when a charge cycle is started and the battery is at 80% of discharge or more, as a non-limiting example.

Figure 2A:
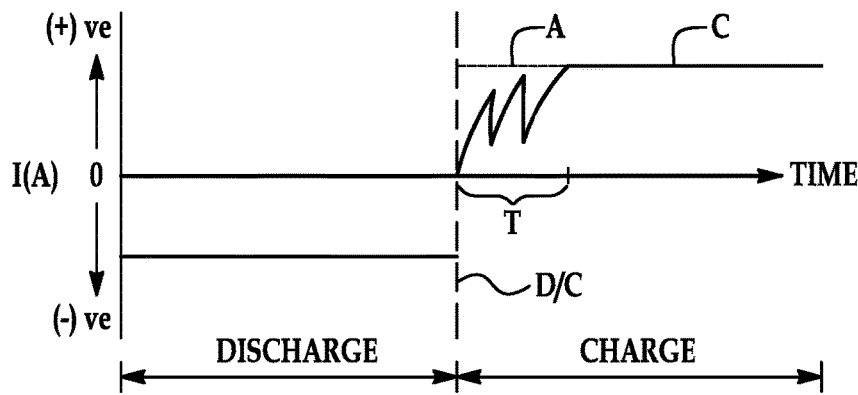
FIG. 2A is a diagram of current versus time for a Li—S battery during discharging and charging using the methods disclosed herein.
Figure 2B:
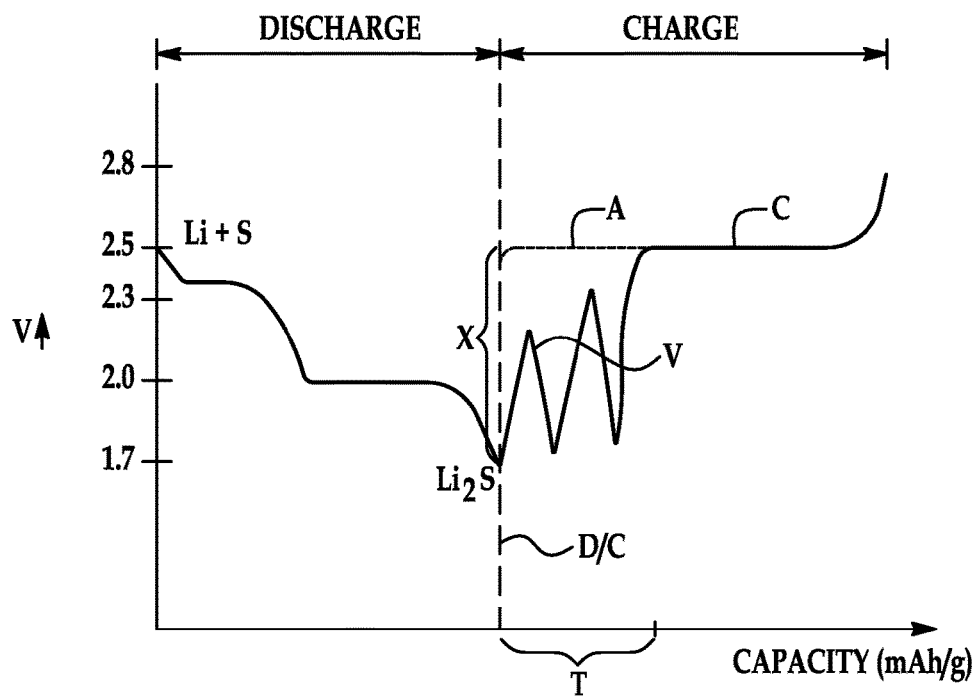
FIG. 2B is a diagram of voltage versus capacity for the Li—S battery during discharging and charging using the methods disclosed herein.

FIGS. 2A and 2B illustrate the application of voltage during the charge/discharge cycles and the battery capacity over time, respectively. As seen in FIGS. 2A and 2B, as the battery discharges, the battery capacity decreases and Li and S form $Li_2S$. Line D/C represents the completion of the discharge cycle and the initiation of the charge cycle. The broken line A in both FIGS. 2A and 2B represent the constant charge and the jump in battery capacity that occurs during conventional charging. As shown in FIG. 2A, conventionally charging at a constant current occurs until the battery has reached its maximum charge capacity. As shown in FIG. 2B, high ohmic voltage loss X occurs upon start of the constant current charging due to the electronically insulating $Li_2S$ film on the cathode. The voltage provided in FIG. 2B is provided by way of illustration and is not meant to be limiting.

As illustrated in FIGS. 2A and 2B, the application period T begins at line D/C, when discharge is complete. Rather than initiating charging at the constant current, voltage pulses V are applied during the application period T. When the application period T is complete, constant current charging C is initiated.

The application period T can be predetermined based on prior evaluations of Li—S batteries. The application period T can be constant throughout the battery life or can be programmed to change based on the number of discharge and charge cycles the battery has experienced. For example, as the number of cycles experienced by the battery increases, the application period T can increase. The Li—S battery system can include one or more sensors that provide battery information to a controller that can adjust the application period T based on the output of the sensor or sensors. As a non-limiting example, the coulombic efficiency of the battery can be calculated by the controller and the application period T extended as the efficiency drops.

The voltage pulses V applied during the application period T create surface defects on the lithium sulfide particles, minimizing the activation energy barrier for lithium sulfide oxidation, and thereby facilitating the dissolution and the reactivity of the lithium sulfide particles. As the defects are created in the lithium sulfide, the lithium sulfide particles dissolve, thereby removing the insulating layer as additional lithium sulfide particles dissolve. The dissolved lithium and sulfur become available as active particles again.

By applying a voltage pulse (less than voltage at constant charging current) the lithium sulfide layer is not decomposed at once, but rather is decomposed in multiple steps. Initial voltage pulses will start by making small defects (i.e. point, line or even plane defects) on the surface of the lithium sulfide particles. The non-perfect lithium sulfide formed during the initial pulses is more reactive and less insulating, thereby allowing its reduction during the charging process at lower voltages than the one at constant current.

It should be noted that the anode chemistry is unchanged during the application period. The voltage pulses target the lithium sulfide forming a coating on the cathode. Characteristics of the applied voltage peaks can be manipulated to optimize the dissolution of the lithium sulfide particles while minimizing any negative effects on the battery cells. The pulse characteristics include a number of pulses, a frequency of pulses, a pulse duration, a peak voltage, a pulse shape, a peak duration, a valley duration and a valley voltage. One or more pulse characteristics can be manipulated to obtain the desired results.

Figure 3:
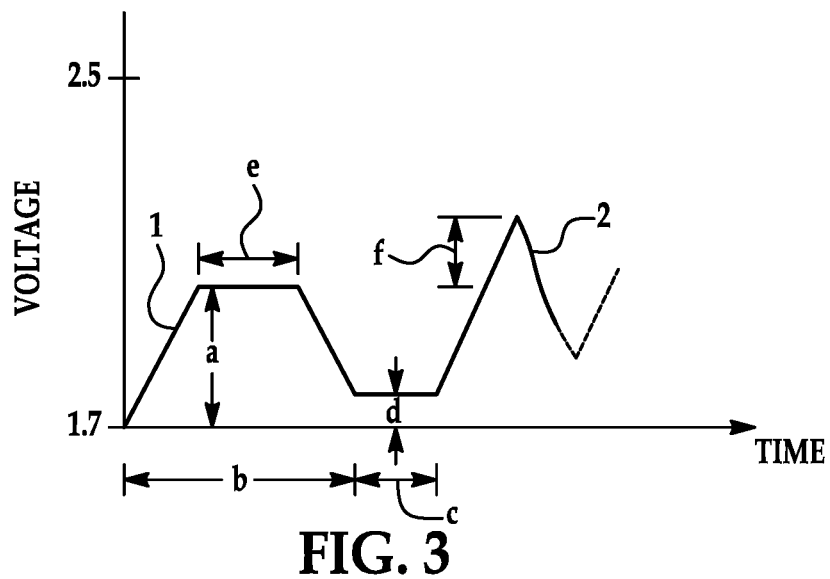
FIG. 3 is a schematic diagram illustrating pulse characteristics.

FIG. 3 illustrates the different pulse characteristics. As shown in FIG. 3, two pulses 1, 2 are illustrated. The peak voltage for each pulse is represented by "a", pulse duration is represented by "b", valley duration is represented by "c", valley voltage is represented by "d", peak duration is represented by "e" and change in peak is represented by "f".

Figure 4A:
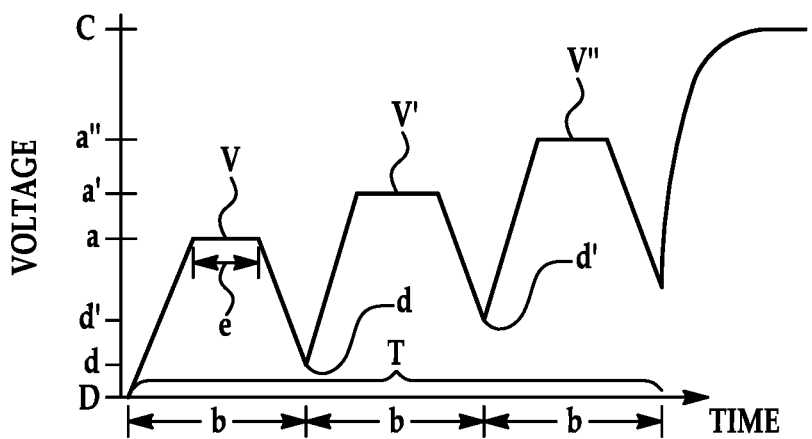
FIGS. 4A and 4B are diagrams illustrating non-limiting examples of pulses applied during the methods disclosed herein.
Figure 4B:
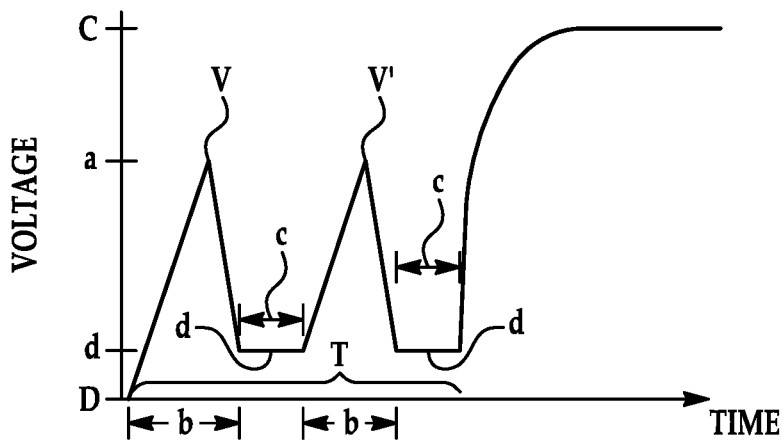

FIGS. 4A and 4B are illustrations of different pulse characteristics that can be applied during the application period T and are provided as non-limiting examples only. In FIG. 4A, the peak voltage a, a', a" gradually increases, in succession, for each of the three pulses V, V', V" applied during the application period T. Each peak voltage a, a', a" is less than the constant current charging voltage C. The pulse characteristics in FIG. 4A are also controlled to apply an extended peak voltage for each voltage pulse V, V', V" for a peak duration e of time before the peak voltage a, a', a" is decreased. Although both the peak duration "e" and the pulse duration b are shown as the same for each voltage pulse V, V', V", one or both of the peak duration "e" and the pulse duration b can be different for one or all of the voltage pulses. FIG. 4A also illustrates controlling pulse characteristics so that a valley voltage d, d' of each valley between adjacent voltage pulses is gradually increased in succession.

In FIG. 4B, the peak voltage "a" is the same for each pulse V, V' applied during the application period T. The pulse characteristics in FIG. 4B are also controlled to maintain each valley between adjacent voltage pulses V, V' at an equal valley voltage "d". Each valley between adjacent voltage peaks V, V' is maintained at "a" constant voltage for a valley duration "c" of time. As in FIG. 4A, each peak voltage "a" is less than the constant current charging voltage C. The valley voltage "d" in each of FIGS. 4A and 4B is illustrated as being greater than the discharged voltage D of the battery, illustrated in FIG. 3 as 1.7V by means of example.

Figure 5:
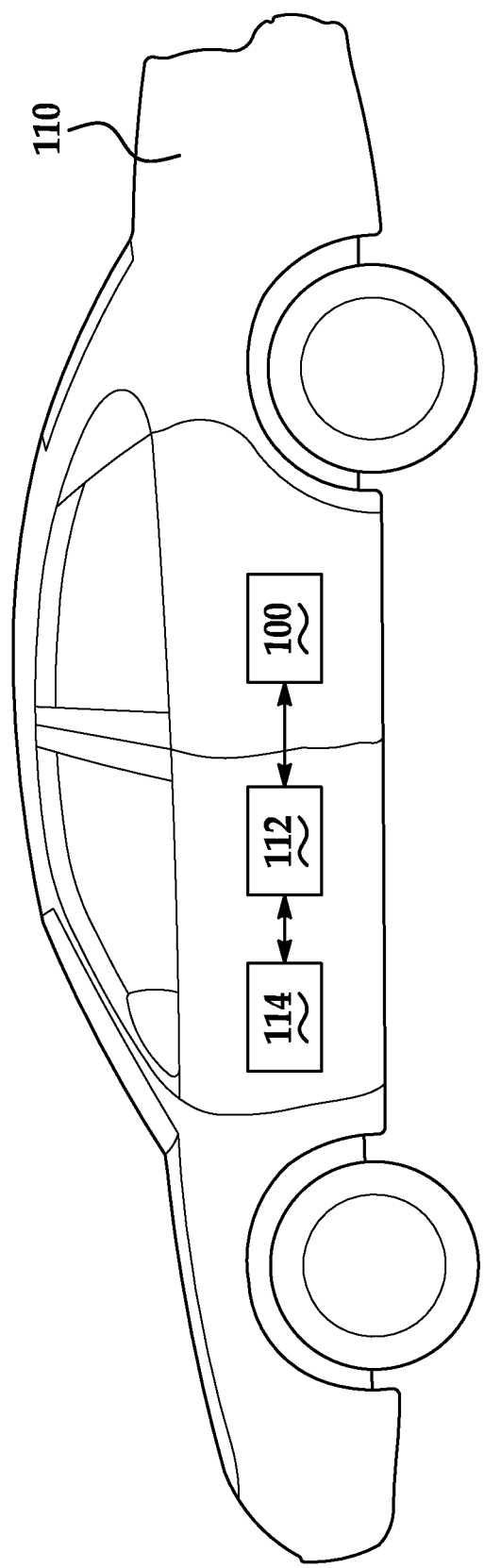
FIG. 5 is a schematic of an apparatus for charging a lithium sulfide battery as disclosed herein.

Also disclosed herein is an apparatus for charging a lithium-sulfur battery having at least one unit cell comprising a lithium-containing anode and a sulfur-containing cathode with an electrolyte layer there between. The apparatus 100 is illustrated in FIG. 5 as a computing device having a memory and a processor configured to execute instructions stored in the memory. The apparatus 100 is illustrated as being on board the vehicle 110 and may be included in a telematics unit of the vehicle 110 as a non-limiting example. However, it is understood that the apparatus 100 may be located remote from the vehicle 110 and receiving and transmitting information wirelessly with the vehicle 110, through, for example, the telematics unit.

The apparatus 100 performs the methods described herein by communicating with the battery charging system 112 to apply voltage pulses to the battery 114 for an application period, the application period initiated when a battery charge cycle is initiated. The battery charging system 112 is shown on-board vehicle 110 and can be an on-board energy source, such as another battery or a capacitor. The battery or capacitor can be charged, for example, by an on-board regenerative braking system or an off-board charger. The battery charging system 112 can also be an off-board charger to which the vehicle battery 114 is connected when charging is desired or required. The apparatus 100 communicates with the battery charging system 112 to maintain voltage pulses less than a constant current charging voltage and to control the pulse characteristics of the voltage pulses as described above. The apparatus 100 communicates with the battery charging system 112 to initiate constant current charging after the application period is complete. It is understood that the apparatus 100 can be a part of the battery charging system 112 if desired, or can be a separate unit as illustrated.

Implementations of computing devices to carry out the processes (and the algorithms, methods, instructions, etc., stored thereon and/or executed thereby as described herein) may be realized in hardware, software, or any combination thereof. The hardware can include, for example, computers, IP cores, ASICs, PLAs, optical processors, PLCs, microcode, microcontrollers, servers, microprocessors, digital signal processors or any other suitable circuit. In the claims, the term "processor" should be understood as encompassing any of the foregoing hardware or other like components to be developed, either singly or in combination.

In one example, a computing device may be implemented using a general purpose computer or general purpose processor with a computer program that, when executed, carries out any of the respective methods, algorithms and/or instructions described herein. In addition or alternatively, for example, a special purpose computer/processor can be utilized which can contain other hardware for carrying out any of the methods, algorithms, or instructions described herein.

Further, some or all of the teachings herein may take the form of a computer program product accessible from, for example, a tangible (i.e., non-transitory) computer-usable or computer-readable medium. A computer-usable or computer-readable medium is any device that can, for example, tangibly contain, store, communicate, or transport the program for use by or in connection with any processor. The medium may be an electronic, magnetic, optical, electromagnetic or semiconductor device, for example.

As described herein, the processes include a series of steps. Unless otherwise indicated, the steps described may be processed in different orders, including in parallel. Moreover, steps other than those described may be included in certain implementations, or described steps may be omitted or combined, and not depart from the teachings herein.

All combinations of the embodiments are specifically embraced by the present invention and are disclosed herein just as if each and every combination was individually and explicitly disclosed, to the extent that such combinations embrace operable processes and/or devices/systems. In addition, all sub-combinations listed in the embodiments describing such variables are also specifically embraced by the present device and methods and are disclosed herein just as if each and every such sub-combination was individually and explicitly disclosed herein.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. An apparatus for charging a lithium-sulfur battery having at least one unit cell comprising a lithium-containing anode and a sulfur-containing cathode with an electrolyte layer there between, the apparatus comprising:
    a battery charge/discharge controller;
    a battery sensor for detecting a state of charge of the lithium-sulfur battery;
    a memory; and
    a processor in communication with the battery charge/discharge controller and configured to execute instructions stored in the memory to instruct the battery charge/discharge controller to:
        while cycling the lithium-sulfur battery during normal use of the lithium-sulfur battery, apply voltage pulses during a voltage application period, initiated when the battery charge/discharge controller would normally initiate a battery charge cycle based on the state of charge of the lithium-sulfur battery as detected by the battery sensor, the application period delaying initiation of the battery charge cycle,
        wherein the voltage pulses are less than a constant current charging voltage and dissolve lithium sulfide formed on the sulfur-containing cathode of the lithium-sulfur battery; and
        initiate constant current charging after the application period has elapsed.

2. The apparatus of claim 1, wherein the processor is configured to instruct the battery charge/discharge controller to apply the voltage pulses to create surface defects on lithium sulfide particles.

3. The apparatus of claim 1, wherein the processor is configured to instruct the battery charge/discharge controller to apply the voltage pulses to optimize coulombic efficiency of the battery.

4. The apparatus of claim 1, wherein the processor is configured to instruct the battery charge/discharge controller to control pulse characteristics of each voltage pulse while applying the voltage pulses during the application period.

5. The apparatus of claim 4, wherein the processor is configured to instruct the battery charge/discharge controller to control the pulse characteristics to optimize dissolution of lithium sulfide formed on the sulfur-containing cathode of the battery.

6. The apparatus of claim 4, wherein the pulse characteristics include one or more of a number of pulses, a frequency of pulses, a pulse duration, a peak voltage, a pulse shape, a valley duration, and a valley voltage.

7. The apparatus of claim 6, wherein the pulse characteristics include the peak voltage and wherein the processor is configured to instruct the battery charge/discharge controller to control pulse characteristics by gradually increasing, in succession, the peak voltage of each of the voltage pulses, each peak voltage being less than the constant current charging voltage.

8. The apparatus of claim 6, wherein the pulse characteristics include the peak voltage and wherein the processor is configured to instruct the battery charge/discharge controller to control pulse characteristics by applying the peak voltage for each voltage pulse for a duration of time before the peak voltage is decreased.

9. The apparatus of claim 6, wherein the pulse characteristics include the valley voltage and wherein the processor is configured to instruct the battery charge/discharge controller to control pulse characteristics by applying an equal valley voltage to each valley between adjacent voltage pulses.

10. The apparatus of claim 6, wherein the pulse characteristics include the valley voltage and wherein the processor is configured to instruct the battery charge/discharge controller to control pulse characteristics by gradually increasing, in succession, the valley voltage of each valley between adjacent voltage pulses.

11. The apparatus of claim 1, wherein the application period is only initiated when a battery state of charge is at or below a predetermined threshold state of charge, and if the battery state of charge is not at or below the predetermined threshold, the battery charge cycle is initiated.

12. The apparatus of claim 11, wherein the predetermined threshold state of charge is 20%.

13. The apparatus of claim 1, wherein a low voltage of the voltage pulses is greater than a discharge voltage.

* * * * *